United States Patent Office 3,529,178

Patented Sept. 15, 1970

3,529,178

VARIABLE SIGNAL DETECTING CIRCUIT

James R. Bailey, Milwaukee, Wis., assignor to Johnson Service Company, Milwaukee, Wis., a corporation of Wisconsin Filed June 22, 1966, Ser. No. 559,482

Int. Cl. H03k *5/20*

U.S. Cl. 307—235 4 Claims

ABSTRACT OF THE DISCLOSURE

The disclosure includes a circuit connected to a selected portion of an incoming direct current signal. A first branch includes a forward biased diode and a resistance to provide a fixed bias voltage at the junction. The second branch includes a first transistor having the base connected to this junction and a variable resistor in the emitter circuit and having a suppression resistor in the collector circuit. A selected constant voltage drop appears across the suppression resistor. The load circuit is an emitter-follower circuit having the load in the emitter of a solid state unit, the base of which is connected to the collector of the first transistor.

This invention relates to a signal sensitive circuit and particularly to a circuit for accurately detecting small changes in a comparatively large voltage.

Although systems are known in which small changes in a relatively large signal can be detected for control purposes and the like, all of them have certain disadvantages. Such circuits generally require means to suppress the voltage until the operating level is obtained. Bridge circuits employing nonlinear elements and series connected Zener diodes have been suggested to detect such voltage changes. However, such devices are relatively fixed in their suppression setting and the nonlinear circuits generally are restricted to low power units. Potentiometer circuits with separate battery device and balance amplifiers may be employed. Such devices have disadvantages from the standpoint of stability, life and cost. Comparator systems using separate biasing can be employed but require relatively complex controllers and an external power supply.

The present invention is particularly directed to a relatively simple, reliable and stable circuit for suppressing a selected portion of an incoming direct current signal and for detecting subsequent changes in the signal.

Generally, in accordance with the present invention, the incoming signal voltage is employed as a power source for energizing a solid state detection circuit having a voltage suppressing circuit establishing an adjustable presettable suppressing voltage. This circuit is applied to a load circuit including a transducer means. Generally, the load circuit includes an amplifying unit connected in a follower configuration such as a transistor emitter-follower with the load in the emitter circuit and the input to the unit connected to the output of the voltage suppressing circuit such that the input circuit of the emitter-follower is in series with the preset voltage.

In a preferred construction, parallel branch circuits are connected across the incoming signal lines. A first branch includes a diode and an impedance to provide a fixed bias voltage at the junction thereof essentially independent of the signal input. The second branch includes a transistor having an impedance in the collector circuit. This provides a constant voltage drop across the resistor and a selected voltage at the collector. The output or load circuit is an emitter-follower circuit having the load in the emitter of a solid state unit, the base of which is connected to the collector of the second branch.

In operation, the input bias of the emitter follower circuit is in series with the load and the fixed voltage dropping impedance such that the voltage across the load will be closely approximated by the signal voltage minus the constant voltage drop across the impedance.

The load element is preferably connected in circuit through cutoff diode means to eliminate operation when insufficient gain is established in the second branch to provide the desired emitter-follower action and thus the one to one relationship between the input voltage minus the preset voltage over the output voltage.

The drawings furnished herewith illustrate preferred constructions of the present invention which provides the above advantages and features as well as others which will be clear from the following description.

Figure 1:
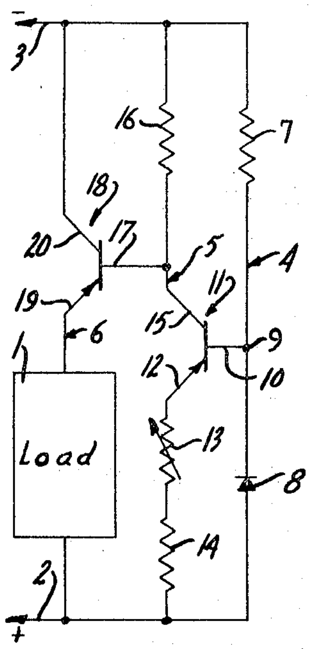
FIG. 1 is a schematic circuit diagram showing the basic principles of the present invention.
Figure 2:
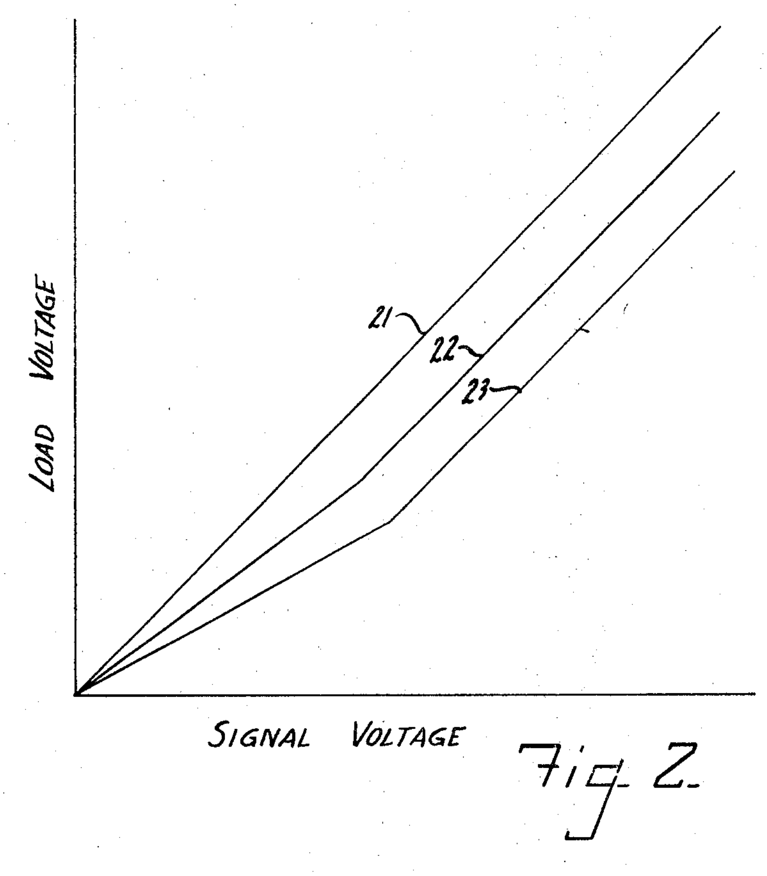
FIG. 2 is a graphical illustration of the load voltage versus the signal input voltage.
Figure 3:
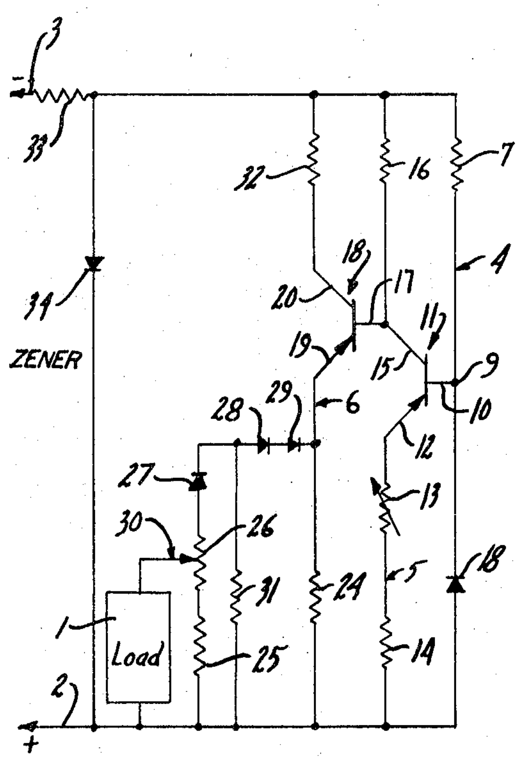
FIG. 3 is a schematic circuit diagram of an alternative practical circuit particularly adapted for control purposes.
Figure 4:
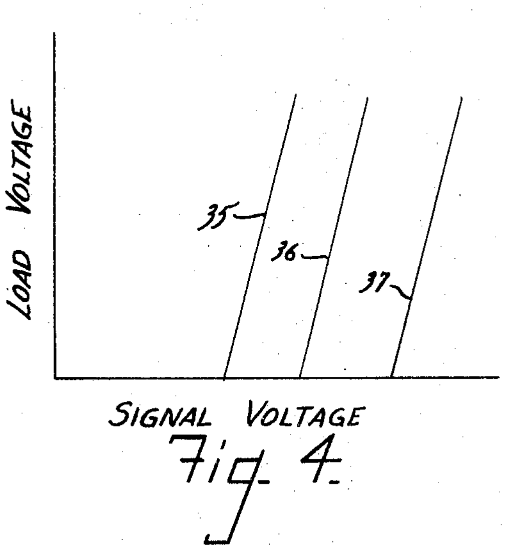
FIG. 4 is a graph illustrating the characteristics of the modified circuit of FIG. 3.

Referring to the drawings and particularly to FIG. 1, the present invention is shown for operating any desirable electrical load 1 in accordance with an incoming direct current signal voltage appearing between the signal lines 2 and 3 forming connection means to a voltage signal source. In accordance with the present invention, the detection circuit includes three parallel branches including a constant bias branch 4, a preset voltage suppression branch 5 and a load circuit branch 6.

The constant bias voltage branch includes a resistor 7 in series with a diode 8. This establishes approximately four-tenths (.4) of a volt potential at the junction 9 of the diode 8 and the resistor 7. This potential is essentially independent of the incoming signal voltage.

The junction 9 is connected as the input bias to the base 10 of a transistor 11 in the preset voltage suppression branch 5.

The illustrated transistor 11 is a PNP transistor having the base 10 connected to the junction 9 and the emitter 12 connected in series with an adjustable resistor 13 and a fixed resistor 14 to the positive signal line 2. The collector 15 is connected in series with the preset voltage resistor 16 to the negative signal line 3. As a result of the fixed voltage supplied by the diode 8 across the base to emitter of transistor 11 in series with the series connected emitter resistors 13 and 14, a fixed current flows through the transistor 11 essentially equal to the voltage at the junction 9 minus the bias voltage required to drive the transistor 11 divided by the sum of the resistors 13 and 14. The transistor 11 normally establishes .2 of a volt drop and consequently approximately .2 of a volt is provided for establishing the input current and a corresponding constant output current through the output resistor 16.

In operation, changes in the signal voltage tend to change the output current. However, the same change alters the internal resistance of the transistor 11 to counteract such change in output and maintains a constant output current and therefore a constant voltage drop across the resistor 16.

The voltage drop can be varied in the illustrated embodiment by adjustment of the variable resistor 13. The voltage can also be changed by variation of the diode 8 or either of the other two resistors 16 and 14.

The collector 15 of the transistor 11 is connected to base 17 of a load circuit emitter-follower transistor 18.

Sept. 15, 1970 J. R. BAILEY 3,529,178

VARIABLE SIGNAL DETECTING CIRCUIT

Filed June 22, 1966

INVENTOR
JAMES R. BAILEY
BY
Andrus & Starke
Attorneys adjustable limit controller by employing a relay responsive to the current in the load circuit.

Thus, the present system provides a means of detecting to a high degree of accuracy small changes in voltages appearing in a comparatively large voltage. In the preferred construction, the system can suppress any selected portion of the incoming signal and can selectively attenuate the load signal which is in excess of such suppressed portion. One distinct advantage of this system is that the circuit is driven directly and only requires power from the incoming signal as a power source.

The system of the present invention thus provides an improved simplified means for measuring and utilizing small changes in comparatively large voltages without the complexity and limitations of the various other means which have been suggested heretofore.

Various modes of carrying out the invention are contemplated as being within the scope of the following claims particularly pointing out and distinctly claiming the subject matter which is regarded as the invention.

I claim:

1. A circuit for detecting variations in a signal, comprising:
   - direct current signal lines establishng an incoming signal voltage;
   - a bias circuit including a unidirectional conducting member connected in series with a resistor directly across said signal lines and forward biased to conduct by the incoming signal voltage, said conducting member establishing a voltage drop essentially independent of the incoming signal voltage level;
   - a current regulating means connected to said signal lines in parallel with said bias circuit including a transistor having an adjustable impedance element connected in series with its emitter to the one signal line and a suppression impedance element in series with the collector to the second signal line and said adjustable impedance element constituting means to adjust the levels of said current, said current regulating means including said transistor having a base connected to the junction of said conducting member and said resistor in said bias circuit; and
   - a load circuit connected to said signal lines in parallel with said bias circuit and said current regulating means and including a load transistor connected in a follower configuration and having an emitter connected in series with a load to one signal line, the base connected to the collector of the regulating transistor, and the collector connected in series with a collector impedance to the second signal line, thereby placing the emitter to base of the load transistor in series with said suppression impedance element across the signal lines.

2. The circuit of claim 1 wherein the load circuit includes an emitter resistor connected in series with the emitter of the load transistor to the one signal line and said load is connected in series with a second unidirectional conducting means across said emitter resistor.

3. The circuit of claim 2 wherein a potentiometer is connected in series with said second unidirectional conductng means across said emitter resistor and includes a movable slider connected in series with said load to the signal line.

4. The circuit of claim 2 wherein a Zener diode means is connected across the signal line.

References Cited

UNITED STATES PATENTS

| | | | |
|---|---|---|---|
| 3,135,897 | 6/1964 | Lee | 307—235 X |
| 3,376,431 | 4/1968 | Merrell | 307—297 X |
| 3,114,872 | 12/1963 | Allard | 323—4 |

OTHER REFERENCES

"Transistorized Regulated Power Supplies—II" by H. R. Lowry in Electronic Design, Mar. 1, 1956, pp. 32–35.

"Expanded Scale Voltmeter," by E. V. Trainor, in Western Electric Technical Digest No. 2, April 1966, pp. 27–28.

DONALD D. FORRER, Primary Examiner

S. D. MILLER, Assistant Examiner

U.S. Cl. X.R.

307—297; 324—131; 328—150